United States Patent
Lehrter et al.

(10) Patent No.: US 6,699,347 B2
(45) Date of Patent: Mar. 2, 2004

(54) HIGH SPEED EMBOSSING AND ADHESIVE PRINTING PROCESS

(75) Inventors: Mary Ruth Lehrter, Cincinnati, OH (US); Steven Lee Barnholtz, West Chester, OH (US); James Michael Singer, Liberty Township, OH (US); Glenn David Boutilier, Cincinnati, OH (US); Andrew Julian Wnuk, Wyoming, OH (US); Dean Arthur Zimmerman, West Chester, OH (US); Timothy Jude Lorenz, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 51 days.

(21) Appl. No.: 10/151,562

(22) Filed: May 20, 2002

(65) Prior Publication Data

US 2003/0213548 A1 Nov. 20, 2003

(51) Int. Cl.⁷ .................... B32B 31/20; B32B 31/30; B95D 3/00; B31F 1/20
(52) U.S. Cl. .................. 156/230; 156/242; 156/247; 156/289; 156/209; 427/299; 427/359; 427/365; 428/152; 264/286
(58) Field of Search .................. 156/230, 231, 156/242, 244.11, 247, 275.7, 289, 208, 295; 427/267.1, 208.2, 208.4, 299, 355, 359, 363, 365, 366, 407.1, 408, 417, 429, 428; 428/141, 156, 152, 343, 409; 261/167, 286

(56) References Cited

U.S. PATENT DOCUMENTS

| | | | |
|---|---|---|---|
| 4,075,362 A | * | 2/1978 | Concannon ............. 430/99 |
| 4,101,686 A | | 7/1978 | Strella et al. |
| 4,146,659 A | | 3/1979 | Swift et al. |
| 4,163,822 A | * | 8/1979 | Walter .............. 156/230 |
| 4,214,549 A | | 7/1980 | Moser |
| 4,287,280 A | | 9/1981 | Swift |
| 5,212,527 A | | 5/1993 | Fromm et al. |
| 5,662,758 A | | 9/1997 | Hamilton et al. |
| 5,965,235 A | | 10/1999 | McGuire et al. |
| 6,045,961 A | | 4/2000 | Heeks et al. |
| 6,091,924 A | | 7/2000 | Bhattacharya |
| 6,193,918 B1 | * | 2/2001 | McGuire et al. ............ 264/167 |

OTHER PUBLICATIONS

AUSIMONT, Fluorolink® Surface Treatment Agents, www.ausimont.com, p. 1–4.

* cited by examiner

Primary Examiner—J. A. Lorengo
(74) Attorney, Agent, or Firm—Stephen T. Murphy; Peter D. Meyer

(57) ABSTRACT

The present invention provides a process comprising the steps of (a) applying less than about 0.1 grams per square meter (gsm) of a release agent to a transfer surface, wherein the release agent is selected such that a test sample of the release agent having a concentration at or above its critical surface tension concentration, has a surface tension of less than about 50 dyne/cm or forms a contact angle with the material of the transfer surface of less than about 120°; (b) applying an adhesive to the transfer surface; and (c) transferring the adhesive from the transfer surface to a material web. Preferred embodiments are provided where the transfer surface is metals, polymers, elastomers, ceramics, wood, or combinations thereof and the release agent has the formula:

$$X-CF_2O-(C_2F_4O)_p-(CF_2O)_q-CF_2-X.$$

Additional embodiments are provided to continuous and intermittent processes.

20 Claims, 3 Drawing Sheets

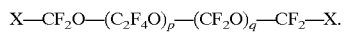

HIGH SPEED EMBOSSING AND ADHESIVE PRINTING PROCESS

FIELD OF THE INVENTION

The present invention relates to improved processes applying adhesive to thin film webs.

BACKGROUND OF THE INVENTION

Three-dimensional sheet materials which include a thin layer of pressure-sensitive adhesive protected from inadvertent contact, as well as methods and apparatus for manufacturing them, have been developed and are described in detail in U.S. Pat. Nos. 5,662,758, issued Sep. 2, 1997 to Hamilton and McGuire, entitled "Composite Material Releasably Sealable to a Target Surface When Pressed Thereagainst and Method of Making"; 5,871,607, issued Feb. 16, 1999 to Hamilton and McGuire, entitled "Material Having A Substance Protected by Deformable Standoffs and Method of Making"; 5,965,235, issued Oct. 12, 1999, in the names of McGuire, Tweddell, and Hamilton, entitled "Three-Dimensional, Nesting-Resistant Sheet Materials and Method and Apparatus for Making Same"; and 6,194,062, issued Feb. 27, 2001, in the names of Hamilton and McGuire, entitled "Improved Storage Wrap Materials". A high speed process for making such materials is described in U.S. Pat. No. 6,163,918, issued on Feb. 27, 2001, in the names of McGuire and Bush.

The processes and equipment for manufacturing such materials described in these patents are suitable for manufacturing such materials, but are either inherently rate limited or are inefficient processes for use on a large production scale. The process described in U.S. Pat. No. 6,163,918 successfully can make the taught product, however problems occur where the adhesive does not release completely from the female embossing roll over an extended run of production. This problem of incomplete transfer may occur due to problems of material incompatibility or the wearing out of previously compatible material. This results in gradual build-up of adhesive on the roll which in turn result in misplaced adhesive on the material web or worse, the failure of the web from releasing from the transfer roll. The speed at which such processes and apparatus can be operated is a major factor in the economics of producing such materials on a commercial scale.

Accordingly, it would be desirable to provide a process and apparatus suitable for forming such three-dimensional sheet materials and applying adhesive at high speed where the release of the adhesive from the printing roll is improved.

SUMMARY OF THE INVENTION

The present invention provides a process comprising the steps of a) applying less than about 0.25 gsm of a release agent to a transfer surface, wherein the release agent is selected such that a test sample of the release agent having a concentration at or above its critical surface tension concentration, has a surface tension of less than about 50 dynes/cm or forms a contact angle with the material of the transfer surface of less than about 120°; b) applying an adhesive to the transfer surface; and c) transferring the adhesive from the transfer surface to a material web. Preferred embodiments are provided where the transfer surface is made from a material selected from the group consisting of metals, polymers, elastomers, ceramics, or wood, or combinations thereof and the release agent has the formula:

$$X-CF_2O-(C_2F_4O)_p-(CF_2O)_q-CF_2-X.$$

Additional embodiments are provided to continuous and intermittent processes.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
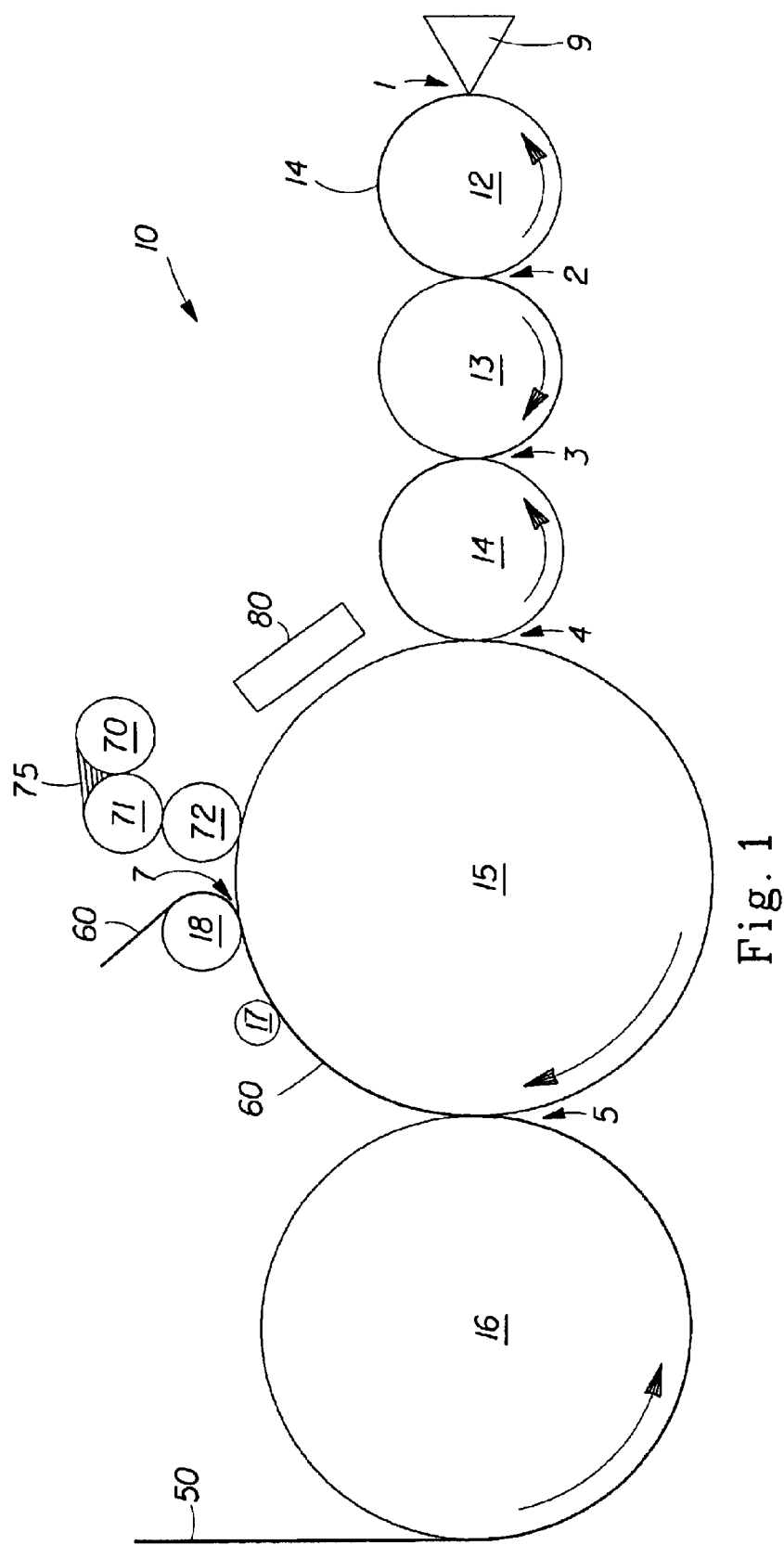
FIG. 1 is a schematic illustration of the process and apparatus according to the present invention where the release agent is applied by an application roll.

The present invention relates to processes which provide material web compositions having applied adhesive.

As used herein, "material web" refers to any thin, permeable or impermeable substrate to be printed on. The web may comprise any material, including, but not limited to, paper, polymeric or plastic films, cloths or fabrics, wovens, nonwovens, laminates, metal foils such as aluminum foil, coated papers, such as wax paper or grease-proof paper, and combinations thereof.

As used herein, "transfer surface" is any surface upon which a substance is placed in order to later be transferred to a material web in a controlled manner. The control may be as to thickness of delivery or selective printing of the substance in specific areas of the web. The transfer surface may serve other purposes, such as forming the material web into a three dimensional structure for aesthetic or functional purposes. The term "forming" as used herein includes all typical methods used in the industry to create a three-dimensional pattern on a material web such as embossing, vacuum drawdown, etc. Preferably, the transfer surface is also an embossing structure. More preferably, the transfer surface is an embossing surface and is used to print a substance into the areas between the embossments.

As used herein, the "critical surface tension concentration" (CSTC) is the concentration of the release agent, in solution, above which there is no further substantial reduction in surface tension. For a surface active agent this point would correspond to the agent's critical micelle concentration or CMC. The critical micelle concentration is a commonly used term by those skilled in the art to describe the concentration of a surface active agent above which there is no further substantial reduction in surface tension.

As used herein, a "neat material" refers to a material substantially free of vehicles or solvents.

As used herein, a "liquid mixture" refers to a liquid composition comprising a vehicle in which a compound is dissolved (solution) or dispersed (emulsion or suspension).

As used herein, a "test sample" refers to a sample of the release agent, which is used in selecting the release agent of the present invention, which is at or above its critical surface tension concentration. The sample may be either a liquid mixture of the release agent at or above its critical surface tension concentration or a sample of the neat release agent material itself, which by definition is undiluted and therefore has a concentration above the agent's CSTC.

As used herein, the "surface tension" of a liquid is the result of cohesive forces at the liquid/air surface and is the force, in dynes, required to break a surface film of a fluid 1 cm long. For example, the surface tension of water is 72 dynes/cm at 25° C.

As used herein, the "contact angle" is defined as the angle between the material comprising the transfer surface and the tangent line drawn to the droplet surface at the three phase point when a liquid drop is resting on a plane solid surface of the material.

As used herein, the term "active" means the chemical compound which provides the actual functional benefit, or the amount of that chemical in a liquid mixture.

All documents cited are, in relevant part, incorporated herein by reference; the citation of any document is not to be construed as an admission that it is prior art with respect to the present invention.

The process of the present invention generally comprises three steps: 1) Application of a release agent to a transfer surface, 2) Application of an adhesive to the transfer surface, and 3) transfer of the adhesive from the transfer surface to a material web.

Application of Release Agent

The release agent may be applied to the transfer surface in any manner convenient to the process, including but not limited to a permeable or impermeable application roller, sprayer, extrusion, absorbent pads, or brushes. The agent mixture or neat material is preferably applied by an applicator roll or by a sprayer. The release agent may be applied in either a continuous mode or an intermittent mode, where the delivery of release agent to the transfer surface is performed only for a fraction of the time the process is transferring adhesive to the material web. The optimum fraction of time required is dependent on the individual process and is determined in production.

Where the application of the release agent is continuous, the rate of addition of the release agent is such that an equilibrium is established where the release agent added is roughly equal to the amount of release agent transferred to the web. For continuous applications, the release agent of the present invention is delivered to the transfer surface at a rate of less than about 0.25 grams of release agent per square meter (gsm), preferably less than about 0.10 gsm, more preferably less than about 0.05 gsm, even more preferably less than about 0.01 gsm, and most preferably less than about 0.005 gsm. The release agent is delivered to the transfer surface at a rate greater than about 0.00001 gsm, preferably greater than about 0.0001 gsm.

The rate of addition of the release agent to the transfer surface may be measured in several ways, but the preferred method is by mass balance on the release agent around the application process. The measurement should be made after the process has stabilized into its running conditions, where over time all of the material added to the process is transferred to the web so there is no resulting long-term build-up or starvation of the release agent on the roll. The rate of addition is the mass flow of release agent, corrected for any loss by the process (overspray, overflow from flooded nips, spilled, wiped off, etc.), divided by the width and the line speed (area of application). For example, 112 g/min of a 0.2% active solution of release agent that is applied to a transfer surface in contact with a 0.5 meter wide web traveling at 450 m/min. will deliver approximately 0.001 gsm of active release material, assuming none is lost in the process. This "stabilized process" does not imply instantaneous equilibrium. A stable process may include a process of applying a relatively high amount of release agent, then stop the release agent application and running the process for an extended period of time until the process must be refreshed.

The rate of delivery of the release agent actually used will be dependent on the adhesive used, the material of the transfer surface and the fraction of the transfer surface which contacts adhesive to the web. For example, an embossing transfer surface which is only contacting adhesive to the web over 40% of the overall area will need much less release agent to operate efficiently, than a transfer surface which contacts adhesive to the entire (100%) material web.

Where the application of the release agent is intermittent, a "duty cycle" is determined as the time when the release agent is being applied followed by the time when it is not. When the release agent is being applied, the addition rate is less than about 5 gsm, preferably less than about 1 gsm, more preferably less than about 0.1 gsm, and most preferably less than about 0.01 gsm. The release agent is delivered to the transfer surface at a rate greater than about 0.00001 gsm, preferably greater than about 0.0001 gsm. The average duty cycle delivery rate, as measured over the average duty cycle, is the mass of release agent added during an average duty cycle, corrected for any loss by the process (overspray, overflow from flooded nips, spilled, wiped off, etc.), divided by the width and total length of material web treated during the average duty cycle (area of application). The average duty cycle delivery rate is less than about 0.1 gsm, preferably less than about 0.01 gsm, and most preferably less than about 0.001 gsm. The average duty cycle delivery rate is greater than 0.00000001 gsm, preferably greater than about 0.0000001 gsm, more preferably greater than 0.000001 gsm, and even more preferably greater than 0.00001 gsm, and most preferably greater than 0.0001 gsm.

The release agent may be applied to the transfer surface in the form of a liquid mixture or as a neat material. Where the release agent is applied as a neat material, the agent is applied directly to the transfer surface. The release agent may be applied by extruding, spraying, or misting, or by using a applicator roll, optionally supplied by a roller stack which delivers low levels of material. Preferably the release agent material or mixture is applied using an applicator roll which transfers the agent to the transfer surface. These applicator rollers may be comprised of any roller material known in the industry, such as polymeric or elastomeric materials such as rubber or urethane, or metals such as chrome or steel. Preferably, this applicator roller comprises a polymeric or elastomeric material embedded with metal oxide particles. Additionally, the applicator roller contacting the transfer surface may be supplied by one or more additional metering rollers, which may aid in controlling the amount of release agent applied to the transfer surface. The metering rolls may also comprise any material typically used for such applications and may be in any configuration. Referring to FIG. 1, preferred configurations include rolls 72-71-70 which may be all polymeric/elastomeric or a polymeric/elastomeric—metal—polymeric/elastomeric configuration. Additionally, the metering rolls 71 and 72 may also preferably comprise an polymeric or elastomeric material embedded with metal oxide particles.

Where a liquid mixture is used, the vehicle can be any solvent capable of dispersing or dissolving the selected release agent. Preferably the vehicle of the mixture is selected from the group consisting of water, $C_2$–$C_4$ alcohols, volatile hydrocarbons, esters, ketones, ethers, and mixtures thereof. Most preferably the vehicle is water. The mixture used in the present process may have any concentration which optimizes fluid handling as long as the desired amount of release agent is delivered to the transfer surface. Preferably the mixture has a concentration ranging from about 0.01% to about 20%, preferably from about 0.05% to about 1%.

The release agent of the present invention is selected such that a test sample of the release agent in the chosen vehicle where the concentration of the release agent is at or above its critical surface tension concentration forms a contact angle with the material of the transfer surface of less than about 120°, preferably less than about 90°, more preferably less than about 75°, even more preferably less than about 50°, and most preferably less than about 20°. The release agent may also be selected such that the test sample has a surface tension of less than about 50 dyne/cm, preferably less than about 40 dyne/cm. Preferably the release agent is selected such that the test sample both forms a contact angle less than about 120°, preferably less than about 90°, more preferably less than about 75°, even more preferably less than about 50°, and most preferably less than about 20° and has a surface tension less than about 50 dyne/cm, preferably less than about 40 dyne/cm. It is noted that the test sample used to determine the optimum release agent (above the CSTC) is not necessarily the same as the liquid mixture concentration used in the application step of the present process. Without being limited by theory, it is believed that the vehicle in the process mixture evaporates after application to the transfer surface such that the concentration at the point of the adhesive application is much closer to the CSTC than the applied concentration.

The release agent may be preferably selected from the following materials:
- fluorocarbons, such as that found in emulsion form in FE-20AG® from Ausimont,
- perfluoropolyethers, such as Fluorolink F-10®, Fomblin® PFPE, Galden® PFPE, all from Ausimont,
- fluorosurfactants, such as Lodyne® from Ciba Specialty Chemicals, FluorN® from Cytonix Corp., Fluorad® FC-4430 and FC-4432 from 3M, and Zonyl® FSP from DuPont,
- surfactants, including anionic surfactants (such as those found in Cinch® and Dawn® from The Procter & Gamble Company), nonionic surfactants, cationic surfactants, zwitterionic surfactants and combinations thereof,
- silicone oils, used neat, such as SF18–350® from General Electric, or as found in emulsions, such as SM2128® from General Electric,
- mineral oils, used neat, such as Kaydol® from Crompton Corp. or as emulsion,
- polyether-silicone copolymers, such as Q4-3667 from Dow Corning,
- block copolymer surfactants, such as P123®, L-62®, L-64®, L-44@, 17R4®, and 10R-5® from BASF,
- phosphotidylcholines, as found in solutions such as Lecithin® from Lucas Meyer, and Precept 8160® from Central Soya,
- waxes, such as those found in emulsions such as Polygen® Wax Emulsion, and mixtures thereof. Preferred release agents are selected from the group consisting of perfluoropolymers having the formula:

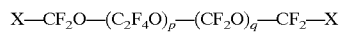

where the end groups, X, are selected from the group consisting of phosphorous moieties, alkyl amide moieties, silane moieties, or mixtures thereof; the ratio of p:q ranges from about 0.5 to about 1.5, preferably from about 0.8 to about 1.1, and more preferably from about 0.9 to about 1.05; and the polymer has a weight average molecular weight ranging from about 1500 to about 5000, preferably from about 2000 to about 3500, more preferably from about 2400 to about 3100. Especially preferred are Fluorolink 7006®, Fluorolink 7007®, Fluorolink A10®, Fluorolink F10®, Fluorolink S10® from Ausimont, Inc. Most preferred is Fluorolink F10®.

As indicated above, the selection of the release agent may be optimized based on the material chosen for the transfer surface. The transfer surface may be made of a wide range of materials, ranging from metals, such as steel, chrome, aluminum, or nickel; polymers or elastomers, such as plastics, rubbers or polyurethane; ceramics or wood. The transfer surface may comprise metal-plated rolls such as nickel or chrome plated steel rolls. The transfer surface may also be made of a combination of materials such as a surface comprised of polymeric or elastomeric materials embedded with metal oxide particles. An example of such a combination is hydrogenated nitrile rubber embedded with iron oxide particles.

It has been found that the process of the current invention is optimized where certain preferred release agents are used with certain transfer surface materials. Preferably, the process of the present invention utilizes the perfluoropolyethers release agent having the formula:

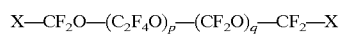

where the end groups, X, are chosen based on the chosen transfer surface. Most preferably the transfer surface is a metal, preferably steel, and X is a phosphorous moiety; or the transfer surface is selected from the group consisting of plastic, polymer, or elastomer and X is a silane; or the transfer surface is wood and X is an alkyl amide; or the transfer surface comprises embedded metal oxide particles and X is a phosphate.

Application of Adhesive

The process of the present invention also comprises the step of applying adhesive to the transfer surface. The process of the present invention may be used to transfer any adhesive material. Adhesive materials include all materials typically considered for use to adhere one material, the material web here, to a target surface. These include, but are not limited to, glues and hot melt pressure sensitive adhesives.

The adhesive may be applied to the transfer surface by any conventional application method known in the industry. This includes roller application, extrusion, brush, or pads. The process of the present invention may be a continuous operation or an individual sheet operation.

A preferred embodiment of the present invention comprises a continuous process where the transfer surface is a roller which continuously receives adhesive from the adhesive application process at one point in its rotation and transfers the adhesive to the material web at a second point. The release agent of the present invention is preferably continuously or intermittently applied to the transfer roll surface at a third position in the rotation, preferably at a point before the adhesive is applied.

Transfer of Substance to Material Web

The process of the present invention also comprises the step of transferring the adhesive from the transfer surface to the material web. Again, this transfer may be accomplished by any means known in the industry. Preferably, the adhesive is transferred by passing the material web over the transfer roll of the current process.

Figure 2:
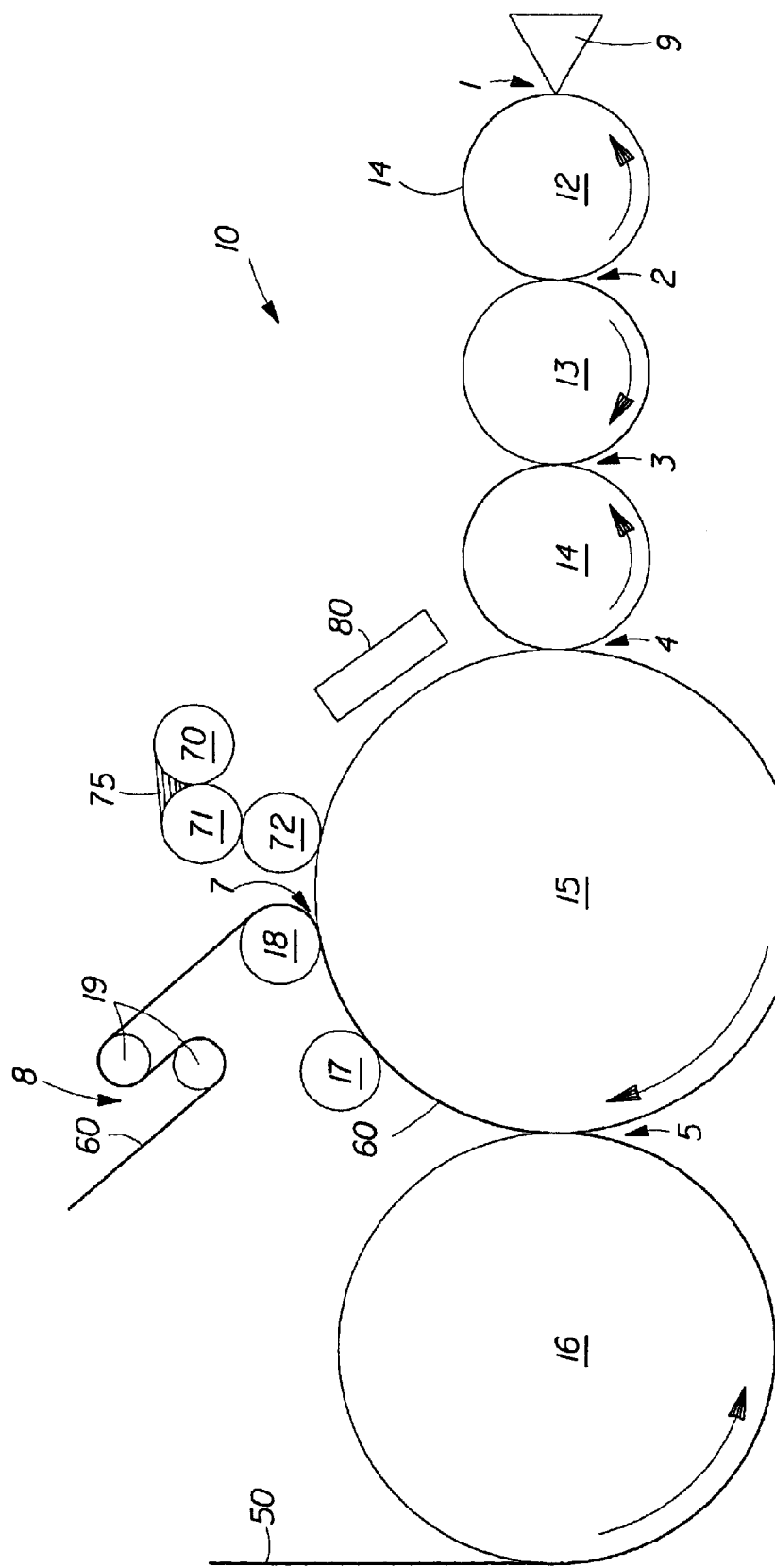
FIG. 2 is a schematic illustration of an alternative process and apparatus according to the present invention where the release agent is applied by an application roll as part of a three roller application system.

FIGS. 1 and 2 illustrate, in schematic form, exemplify embodiments of the processes and apparatus 10 of the present invention where adhesive is the substance printed onto a simultaneously embossed material web 50. The apparatus to run the process of the present invention may comprise two mated embossing rolls 15 and 16, and a liquid applicator roll 72 and multiple adhesive metering/application rolls 12–14. The apparatus may optionally comprise metering rolls 70–71, a chilled S-wrap 19, a pressure roll 17 or a strip-off roll 18. The embossing rolls 15 and 16 may optionally have a matched embossing pattern etched into them which interlocks to emboss a web of sheet material passed therebetween. The roll with pockets and raised lands is referred to as the female embossing roll 15, while the roll with raised nubs and recessed lands is referred to as the male embossing roll 16. The release agent liquid application/metering rolls 70–72 deliver the release agent 75 to the transfer surface. The release agent liquid application/metering rolls are typically either metal, such as steel or chrome, or rubber coated steel. Similarly, the adhesive application/metering rolls 12–14 may also be metal or rubber coated steel. In one embodiment, both sets of applicator rolls alternate between being plain steel or rubber-coated steel. The material of the application rolls 14 and 72 (the last roll in the respective delivery systems) is chosen based on the material chosen for the transfer surface. It has been found that if the transfer material is metal, the preferred final application roll should be rubber coated steel. Alternately, if the transfer material is polymeric or elastomeric, a metal applicator roller may be preferred. A radiant heater 80 or some other source of heat, may optionally be used to heat the transfer surface after application of the release agent.

The optional pressure roll 17 and strip off roll 18 may be rubber coated steel or other suitable material. An optional chilled S-wrap may be utilized which may be composed of hollow steel rolls 19 with a release coating on their outside surfaces and coolant flowing through the rolls. The direction of roll rotation is shown in FIG. 2 with arrows.

As shown in FIG. 1, an adhesive (such as a hot melt pressure sensitive adhesive) may be extruded onto the surface of the first rotating roll 12 via a slot die 9. The slot die may be supplied by a hot melt supply system (with a heated hopper and variable speed gear pump, not shown) through a heated hose. The surface speed of the first of the adhesive metering rolls 11 may be considerably slower than the nominal tangential line speed of the web of sheet material 50 to be embossed and adhesive-coated. The metering nips are shown in FIG. 1 as stations 1, 2, and 3. The remaining adhesive metering rolls 12–14 may rotate progressively faster so that the adhesive application nip, station 4, is surface speed matched. The adhesive 40 is transferred from the adhesive application roll 14 to the female embossing roll 15 at station 4. The adhesive 40 travels with the female embossing roll surface to station 5, where it is combined with the polymer web 50 which is carried into station 5 via male embossing roll 16.

In the embodiment shown in FIG. 1, at station 5, the polymer web 50 is embossed and printed with the adhesive 40 simultaneously to form an adhesive coated web 60. The web 60, still glued to the female embossing roll 15, travels to station 7, where it is stripped off the female embossing roll 15 via strip-off roll 18. The process may also include an optional pressure roll 17 which applies pressure to the glued portion of the web between the embossment and the strip off roll. The finished adhesive-coated web 60 then may travel to an optional chilled S-wrap 19 at station 8, where it is cooled to increase its strength.

In certain embodiments, the adhesive 40 is applied to the land areas of the female embossing roll 15 only. This is accomplished by carefully controlling the female embossing roll to adhesive application roll clearance and runout at station 4. The nip between these rolls is controlled such that the adhesive covered rubber roll 14 applies adhesive to the lands only, without pressing the adhesive into the recesses or pockets between lands.

In these embodiments, when the female roll is metal, the adhesive application roll 14 may be a rubber coated steel roll. The rubber coating is preferably ground to achieve approximately 0.001 inches total indicated runout (TIR) tolerance. The nip may be controlled in the machine with precision wedge blocks. A rubber coating may be utilized to (1) protect the coating on the female embossing roll 15 from damage due to metal-to-metal contact and (2) allow the adhesive application roll to be very lightly pressed against the female embossing roll, so that the deflection of the rubber compensates for the actual runout of the embossing roll and adhesive application roll, allowing adhesive to be applied everywhere evenly on the female embossing roll lands.

Where an embossing female roll is used, the adhesive application roll 14 may be lightly pressed against the female embossing roll 15 such that the deflection of the rubber surface compensates for embossing roll and adhesive application roll runout, but the deflection is not so high as to press adhesive into the pockets in the surface of the female embossing roll 15. In certain embodiments, deposition of adhesive exclusively onto the lands of the female embossing roll 15 is essential to prevent adhesive from being transferred onto the tops of the embossments in the web. Adhesive present on the tops of the embossments may cause them to exhibit adhesive properties prior to activation of the web via crushing of the embossments.

The adhesive utilized may be highly elastic in nature, and a transition from a stationary slot die 9 to full tangential line speed can result in the adhesive being extended and fractured, or in non-adhesion to the first metering roll. To reduce the extension rate of the adhesive, it may be applied first to a slow moving roll and then through a series of metering gaps (stations 1, 2, and 3) it is milled down to a very thin adhesive film and accelerated at the desired tangential line speed.

The adhesive applicator and metering rolls may be ground to exacting tolerances for diameter and runout to maintain the precise inter-roll nip dimensions required for adhesive metering and acceleration. Typical tolerance may be 0.0005 inches TIR.

In certain embodiments it may be desirable to emboss the film at high embossing temperature to promote crisp, high-caliper embossments and allow the glued film web to release from the female embossing roll with lower strip-off force. However, it may be desirable to keep the temperature of the embossing rolls below the softening point of the film web so that the final adhesively-coated web will have sufficient tensile strength to be removed from the female embossing roll. A balance between release temperature and film softening temperature has been found to be one parameter in defining desirable operating conditions for operating at high speeds.

The optional strip-off roll assists in removing the final product from the female embossing roll without damaging the film. Since the product (the material web) is glued to the surface of the female embossing roll, very high forces can be developed at the strip-off point. The strip off roll may localize these high forces to a very short length of web, resulting in less distortion of the web and more control over the strip-off angle. Preventing distortion of the final product is helpful to provide consistent film properties and prevent the film from having regions which are prematurely activated to exhibit adhesive properties.

The amount or degree of engagement between the male and female embossing rolls can be controlled to help prevent damage to the rolls or to the film web. In certain, preferred embodiments the outside surfaces of the embossing rolls are ground to a 0.0005 inch TIR runout tolerance. The engagement may be controlled in the machine with precision wedge blocks. The engagement of the embossing rolls generally governs the final caliper of the film (i.e., the final height of the embossments).

Another important criteria to the making of the embodiment where the web material is both embossed and printed with adhesive, is the fit or correspondence between the male and female embossing rolls. One useful technique used with metal rolls, is to form one roll via a photoetching process and utilize this roll as a "master" to form the other roll as a negative image. The equipment can also be designed so as to maintain precise synchronization of the mating embossing rolls. When elastomeric rolls are used the patterns are applied to the transfer surfaces by laser engraving.

The embossing and adhesive rolls may be individually heated and controlled to allow precise control of adhesive transfer temperatures and embossing roll release temperature.

In certain preferred embodiments, the use of mated male and female embossing rolls with complementary pattern shapes fully supports the thin film web during the embossing and adhesive process step to ensure that the forces are properly distributed within the film material. Full support of the web, as opposed to thermoforming or vacuum forming a film with an open support structure such as an apertured belt or drum wherein the portion of the web being deformed into the apertures or recesses is unsupported, is believed to allow an increase in the rate at which strains are imparted to the web without damage to the web and thus allow for higher production speeds. Simultaneous application of the adhesive to the film during an embossing step may provide more precise registration of the adhesive on the undeformed portions of the web between embossments.

Precise control over the adhesive, particularly the thickness and uniformity of the adhesive layer applied to the female embossing roll, is one factor in producing a product at high speed. Especially in the case of embodiments having very low add-on levels of adhesive, even slight variations in the thickness of the adhesive during transfers from roll to roll can result in coverage gaps by the time the adhesive is applied to the embossing roll. At the same time, such variations can lead to excess adhesive in certain regions of the embossing roll which could either contaminate the recesses in the roll or result in incomplete adhesive transfer to the web and a buildup of adhesive on the embossing roll.

Figure 3:
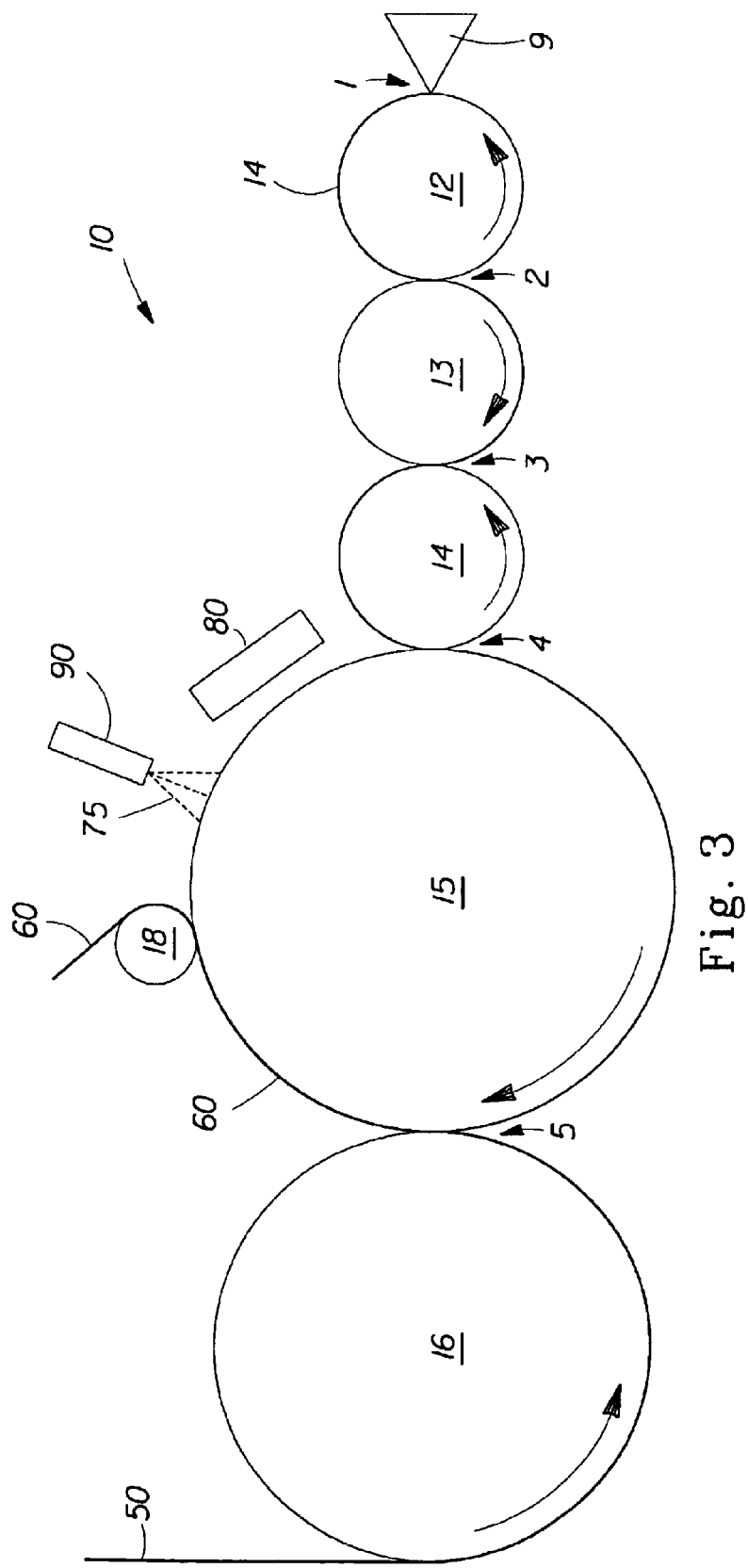
FIG. 3 is a schematic illustration of the process and apparatus according to the present invention where the release agent is applied by a sprayer or mister.

FIG. 3 illustrates another preferred process of the present invention wherein the release agent is applied to the transfer surface by a sprayer 90.

The processes of the present invention can comprise, consist of, or consist essentially of the essential elements and limitations of the invention described herein, as well as any of the additional or optional ingredients, components, or limitations described herein.

All percentages, parts and ratios are by weight of the total composition, unless otherwise specified. All such weights as they pertain to listed ingredients are based on the specific ingredient level and, therefore, do not include solvents, carriers, by-products, filler or other minor ingredients that may be included in commercially available materials, unless otherwise specified.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

Test Methods

As used herein, the "surface tension" of a liquid is the result of cohesive forces at the liquid/air surface and is the force, in dynes, required to break a surface film of a fluid 1 cm long. For example, the surface tension of water is 72 dynes/cm at 25° C. Surface tension is measured for application in the present invention, using a tensionometer, such as with a Fisher Scientific Surface Tensionmat Model 21 utilizing the standard test method described in ASTM D971 where the oil/water fluid is substituted by the test sample of the release agent.

As used herein, the "contact angle" is defined as the angle between the material comprising the transfer surface and the tangent line drawn to the droplet surface at the three phase point when a liquid drop is resting on a plane solid surface of the material. The contact angle is measured using an automated contact angle goniometer, such as a VCA 2500XE Video Contact Angle System from AST Products (Billerica, Mass.). The contact angle is the average of five droplets with a nominal volume of 1 microliter. Standard test method ASTM 5946 describes the test procedure using water and treated films. The contact angle of the release agent test sample on the transfer surface of the present invention is measured by this process substituting the release agent sample for water and the transfer surface material for the treated films.

What is claimed is:

1. A process comprising the steps of:
  a) applying less than about 0.25 gsm of a release agent to a transfer surface,
    wherein the release agent is selected such that a test sample of the release agent having a concentration at or above its critical surface tension concentration, has a surface tension of less than about 50 dynes/cm;
  b) applying an adhesive to the transfer surface; and
  c) transferring the adhesive from the transfer surface to a material web.

2. A process comprising the steps of:
  a) applying less than about 0.25 gsm of a release agent to a transfer surface,
    wherein the release agent is selected such that a test sample of the release agent having a concentration at or above its critical surface tension concentration, forms a contact angle with the material of the transfer surface of less than about 120°;
  b) applying an adhesive to the transfer surface; and
  c) transferring the adhesive from the transfer surface to a material web.

3. A process according to claim 2 wherein the release agent is selected such that the test sample at or above its critical surface tension concentration also has a surface tension of less than about 50 dynes/cm.

4. A process according to claim 3 wherein the release agent is applied as a neat material.

5. A process according to claim 3 wherein the release agent is applied to the transfer surface in the form of a liquid mixture additionally comprising a vehicle selected from the group consisting of water, $C_2$–$C_4$ alcohols, volatile hydrocarbons, esters, ketones, ethers, and mixtures thereof.

6. A process according to claim 1 wherein the transfer surface is made from a material selected from the group consisting of metals, polymers, elastomers, ceramics, wood, or combinations thereof.

7. A process according to claim 3 wherein the release agent is selected from the group consisting of fluorocarbons, perfluoropolyethers, anionic surfactants, silicone oils, polyether-silicone copolymers, block copolymer surfactants, phosphotidylcholines, waxes, esters, mineral oils, emulsions thereof and mixtures thereof.

8. A process according to claim 3 wherein the transfer surface is also a forming surface.

9. A process according to claim 5 wherein the transfer surface is made from a material selected from the group consisting of metals, polymers, elastomers, ceramics, wood, or combinations thereof and the release agent is selected from the group consisting of fluorocarbons, perfluoropolyethers, anionic surfactants, silicone oils, polyether-silicone copolymers, block copolymer surfactants, phosphotidylcholines, waxes, esters, mineral oils, emulsions thereof and mixtures thereof.

10. A process according to claim 9 wherein the release agent has the formula:

$$X-CF_2O-(C_2F_4O)_p-CF_2O)_q-CF_2-X$$

where the end groups, X, are selected from the group consisting of phosphorous moieties, alkyl amide moieties, silane moieties and mixtures thereof; the ratio of p:q ranges from about 0.5 to about 1.5 and the release agent has a weight average molecular weight ranging from about 1500 to about 5000.

11. A process according to claim 10 wherein the combination of transfer surface and X is selected from the group consisting of a metal and a phosphorous moiety; a polymeric or elastomeric material and a silane moiety; wood and an alkyl amide moiety; and embedded metal oxide particles and a phosphorous moiety.

12. A process according to claim 11 wherein the transfer surface is steel and X is a phosphorous moiety.

13. A process according to claim 10 wherein the transfer surface comprises metal oxide particles embedded in polymer or elastomer and X is a phosphorous moiety.

14. A process according to claim 3 wherein the application of the release agent to the transfer surface is continuous.

15. A process according to claim 3 wherein the steps of the application of release agent, the application of adhesive, and the transfer of adhesive occur simultaneously and continuously at different locations in the process.

16. A process according to claim 3 wherein the release agent is applied to the transfer surface by an applicator selected from the group consisting of a permeable application roller, an impermeable application roller, a sprayer, an extruder, an absorbent pad, or brushes.

17. A process according to claim 16 wherein the applicator is an impermeable applicator roller comprising polymeric or elastomeric material embedded with metal oxide particles.

18. A process according to claim 17 wherein the applicator roller is supplied with release agent by one or two metering rollers.

19. A process according to claim 18 wherein the applicator roller comprises a polymeric or elastomeric material embedded with metal oxide particles.

20. A process comprising the steps of:
a) intermittently applying less than about 5.0 gsm of a release agent to a transfer surface such that the average duty cycle delivery rate is less than about 0.1 gsm and greater than about 0.00000001 gsm, wherein the release agent is selected such that a test sample of the release agent having a concentration at or above its critical surface tension concentration, has a surface tension of less than about 50 dynes/cm and forms a contact angle with the material of the transfer surface of less than about 120°;
b) applying an adhesive to the transfer surface; and
c) transferring the adhesive from the transfer surface to a material web.

\* \* \* \* \*